United States Patent [19]

Slee

[11] Patent Number: 4,638,694
[45] Date of Patent: Jan. 27, 1987

[54] MANUFACTURE OF PISTONS

[75] Inventor: Roger H. Slee, Warwick, England

[73] Assignee: AE Plc, Warwickshire, England

[21] Appl. No.: 748,976

[22] Filed: Jun. 26, 1985

[30] Foreign Application Priority Data

Jun. 27, 1984 [GB] United Kingdom ............... 8416380

[51] Int. Cl.[4] .......................... B23B 5/24; B23B 41/04
[52] U.S. Cl. ........................................... 82/18; 82/1.3
[58] Field of Search ...................... 82/18, 1.3; 408/54; 51/34 R

[56] References Cited

U.S. PATENT DOCUMENTS

| 324,331 | 8/1885 | Lyall | 82/1.3 |
|---|---|---|---|
| 2,453,744 | 11/1948 | Chambliss | 82/18 |
| 2,751,800 | 6/1956 | Beach | 82/1.3 |
| 2,762,250 | 9/1956 | Auman et al. | 82/18 |
| 3,066,560 | 12/1962 | Estephanio | 82/18 |
| 3,165,130 | 1/1965 | Sanders | 82/18 |
| 3,595,108 | 7/1971 | Priscsak | 82/18 |
| 3,916,738 | 11/1975 | Neubrand et al. | 82/18 |

FOREIGN PATENT DOCUMENTS

| 746559 | 8/1944 | Fed. Rep. of Germany . |
|---|---|---|
| 303511 | 5/1929 | United Kingdom . |
| 336619 | 10/1930 | United Kingdom . |
| 418680 | 10/1934 | United Kingdom . |
| 444805 | 3/1936 | United Kingdom . |
| 672469 | 5/1972 | United Kingdom . |

Primary Examiner—Lowell A. Larson
Assistant Examiner—Jerry Kearns
Attorney, Agent, or Firm—Leydig, Voit & Mayer

[57] ABSTRACT

Pistons and cylinders are manufactured to an oval shape, which is defined as being an oval where the ratio of the major axis to the major axis is between 1.1:1 and 3:1. Pistons and cylinders are generally finish machined by relative rotation between the tool and the workpiece and movement of the tool in a defined path to produce a finished profile. In general, however, conventional machine tools cannot machine such oval profiles at commercial production rates because of the excessively high tool accelerations which this would involve and of which the conventional machine tools are not capable. Disclosed are a machine tool for matching such oval pistons in which an oval piston blank is rotated in a path such that, when each part of the piston surface reaches the tool, it is at a constant datum position. Thus the tool considers that it is machining a surface of constant radius and normal tool movements can be performed. There is also a boring machine for machining such oval cylinders where the tool is moved in a required oval path. A mechanism is disclosed which can be used either for turning pistons or boring cylinders to ensure that they are complementary with one another.

3 Claims, 3 Drawing Figures

MANUFACTURE OF PISTONS

BACKGROUND TO THE INVENTION

1. Field of the Invention

The invention relates to the manufacture of pistons.

An in-line engine for an internal combustion engine comprises a cylinder block having a number of cylinders of generally circular cross-section arranged in succession along the length of the block; this length being determined by the cooling requirements of the cylinders and the diameters of the cylinders. Any increase in the cylinder diameter, to produce an engine of greater cubic capacity and thus of greater power, will increase the length of the block. Any such increase in the length of the block is also disadvantageous because it necessitates a more expensive crankshaft construction and an increase in the required size of an engine-receiving compartment in an associated vehicle. Alternatively, it necessitates the use of a more expensive "vee" cylinder arrangement.

It is possible to increase the swept volume of the cylinders, and hence increase the power of the engine, by making the cylinders, and their associated pistons, of oval cross-section with the major axis of such a section extending normal to the length of the engine block. As used throughout this specification, a reference to "oval" or to particular forms of oval, such as ellipses, is defined as a reference to an oval where the ratio of the major axis to the minor axis is between 1.1:1 and 3:1, except where the context expressly provides otherwise. The use of oval cylinders or pistons can therefore increase the swept volume of the engine by between 10% and 300% without any increase in the length of the engine block. In addition, the larger cylinder area allows a more favourable disposition inlet and outlet ports and inlet and outlet valves of greater diameter than can be used with generally circular section cylinders and pistons, so improving the breathing of the engine.

2. Review of the Prior Art

In general, pistons and cylinders (whether oval or not) are produced by casting the cylinders and pistons roughly to shape and then by finishing the cylinders and pistons to their final form. In the case of a cylinder, this generally comprises a boring operation using a machine tool followed by a honing operation to give the bore a suitable surface topography to ensure lubricant retention and hence low running friction. In the case of a piston, one common way of finishing is by turning the exterior surface of the piston. It is customary for the piston to be machined with a "barrelled" longitudinal form (i.e. to have a diameter which is a minimum at the end of the piston and a maximum in the centre) and to be slightly non-circular, to allow for expansion effects. Further, the piston may be provided with bearing surfaces in accordance with the teaching of British Patent Specification No. 2079661.

While all these operations have been performed satisfactorily for many years in respect of pistons and cylinders that are right cylindrical or substantially right cylindrical, by the use of conventional machine tools. In general such machine tools cannot cope with pistons and cylinders which are oval, because the required range of tool movement cannot be achieved at speeds which allow the commercial production of cylinders and pistons of significantly oval shape.

SUMMARY OF THE INVENTION

According to a first aspect of the invention, there is provided a machine tool for turning a piston having a surface of oval cross-section, comprising a workpiece holder for holding and rotating the piston, and a tool for turning the piston surface and movable twoards and away from the axis of rotation of the workpiece holder, the workpiece holder moving the piston during rotation such at, in a plane including the line of movement of the tool and normal to the axis of rotation of the workpiece holder, the surface of the piston intersects the line of movement of the tool at a single point, so that the tool turns said surface when at a fixed point along said line of movement.

According to a second aspect of the invention, there is provided a boring machine for boring cylinders of oval cross-section in a cylinder block blank, and comprising a workpiece holder for holding a cylinder block blank stationary, a rotatable boring tool carried by a tool holder for finish boring the interiors of the cylinders, the input shaft for rotating the tool holder, and a mechanism interposed between the input shaft and the tool holder for moving the tool holder during rotation thereof in a path to bore the cylinders to a required oval profile.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
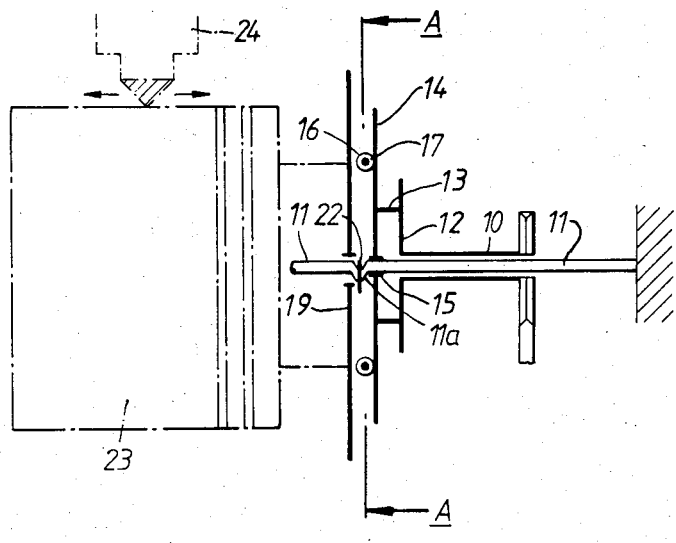
FIG. 1 is a schematic view of a first form of machine tool for rotating an oval piston such that the piston moves at a datum radius relative to a tool.
Figure 1:
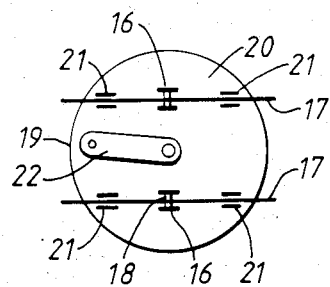

Referring first to FIG. 1, the mechanism comprises a rotatable input shaft 10 arranged coaxially with a stationary lay shaft 11. At one end of the input shaft 10 is mounted a disc 12 which is connected by a pillars 13 to a circular plate 14 having a central bearing 15 rotating about and supported on the lay shaft 11. Sleeves 16 are carried on the plate 14 such that their bores 17 are normal to, and lie in a plane normal to, the axis of the input shaft 10. They are spaced in a radial direction from the axis of the input shaft 10. A guide 17 runs through each sleeve and is fixed thereto by fasteners 18 with lengths of each guide 17 extending to either side of each sleeve.

An output member 19 is for carrying an oval piston with the intersection of its major and minor axes lying on the axis of the input shaft and has a rear face 20 lying in a plane normal to the axis of the output shaft. Carried on this face are two pairs of bushes 21, the bushes of each pair engaging respective opposite ends of one of the guides carried on the plate 14, and being arranged for sliding movement relative thereto. A link 22 is provided which, at one end, is pivotally connected towards the periphery of the surface 20 of the disc 19 and at the other end is mounted for rotation about a fixed bearing 11a which is eccentrically arranged relative to the axis of the lay shaft 11. The line of the axis of the peripheral pivotal connection of the link 22 and the axis of the lay shaft 11 is parallel to the guides 17 and normal to the line of the axis of the lay shaft 11 and the axis of the eccentric bearing 11a.

In use, an oval piston 23 is mounted on the output member 19 and is to be finish machined to a required oval shape.

The input shaft 10 is rotated by a drive. The piston 23 is arranged with its axis coaxial with the axis of the lay shaft 11 such that the line of the axis of the lay shaft 11 and the axis of the eccentric bearing is parallel to the minor axis of the piston 23, and such that the piston is constrained to reciprocation in a direction along the major axis of the oval cross-section of the piston. A tool 24 is mounted such that a tip thereof is movable along a line towards and away from the axis of the lay shaft 11, on the diametrically opposite side thereof to the axis of the eccentric bearing 11a.

As the input shaft 10 is rotated, the output member 19 is also rotated with the link 22 causing the surface of the piston to move in a plane normal to the axis of the lay shaft 11 in a path in which each part of the tool 24 intersects the line of movement of the tool at a single point (i.e. is at a datum radius from the axis of the lay shaft 11, which is the radius of the minor axis of the oval cross-section to which the piston 23 is to be machined). Thus to the tool can machine the piston blank as though it were of constant or circular cross-section, account being taken of the varying angle of the surface of the piston relative to the tool.

Figure 2:
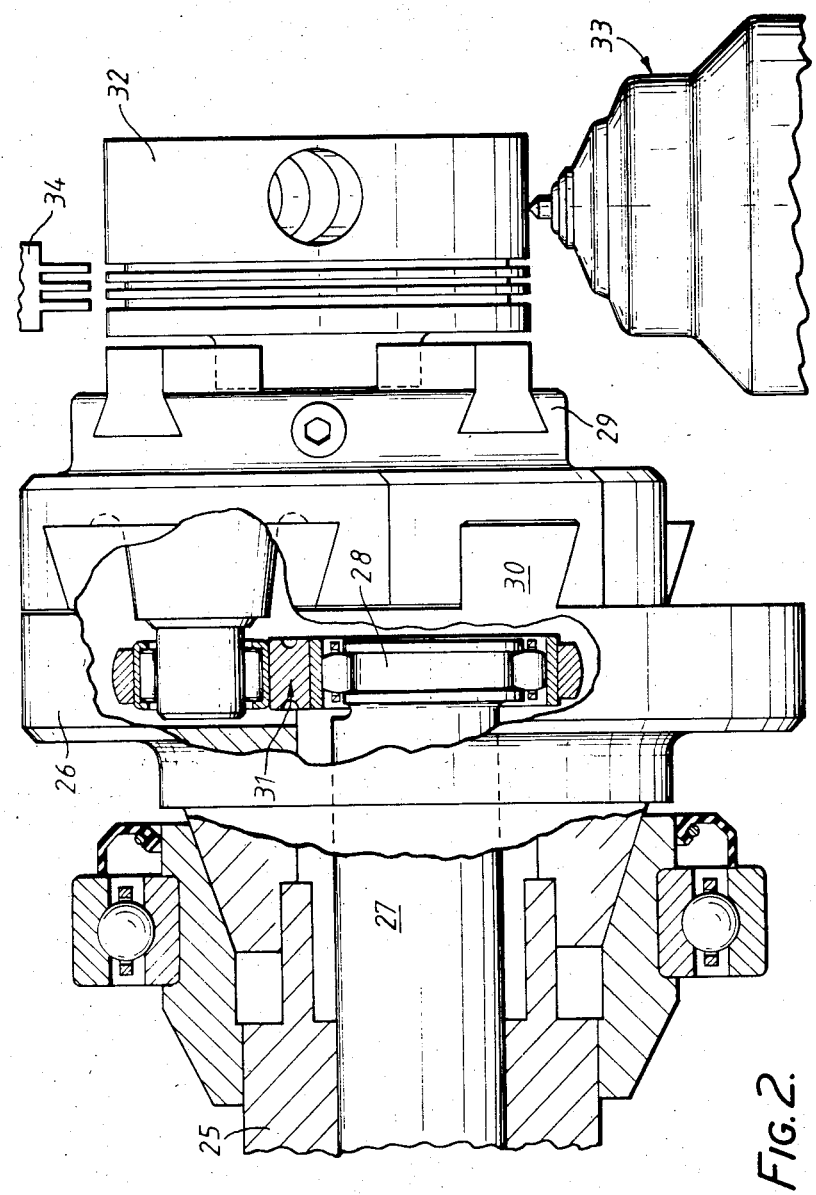
FIG. 2 is an alternative embodiment of the machine tool of FIG. 1.

Referring next to FIG. 2, in this form of the machine tool of FIG. 1, a main spindle 25 drives a chuck body 26 within which is a stationary shaft 27 having an eccentric 28 at one end. An output member 29 is slidable in a plane normal to the axis of the main spindle on slides 30. carried on the chuck body 26. Within the chuck body is a link 31 having at one end an aperture rotatable about the eccentric 28 and at the other end an aperture engaging with a pin mounted eccentrically on the output member 29. The relationship between the axis of the eccentric 28, the axis of the stationary shaft 27 and the slides 30 is the same as the relationship between the axis of the eccentric bearing 11a, the axis of the lay shaft 11 and the guides 17 described above with reference to FIG. 1.

The output member 29 has, for example, jaws which hold an oval piston 32 for machining by a turning tool 33 and by piston ring groove tools 34. The oval piston 32 is held such that the minor axis thereof is parallel to the line of the axis of the eccentric 28 and the axis of the stationary shaft 27. The turning tool 33 is mounted for movement such that its tip lies on an extension of this line on the diametrically opposite side of the axis of the stationary shaft 27, to the axis of the eccentric 28. As the spindle 25 rotates, the chuck body 26 is rotated.

This, in turn, rotates the output member 29 which is moved on the slides 30 by the link 31, so that the oval piston 32 intersects the line of movement of the tool 33 at a single point and thus presents, at the tool 33, a surface at a datum radius (which is the radius of the minor axis of the oval cross-section to which the piston 32 is machined).

It will be appreciated that, in the embodiments of FIGS. 1 and 2, pistons of differing ovality can be accommodated by altering spacing of the axis, the fixed shaft (the lay shaft 11 in FIG. 1 and the stationary shaft 27 in FIG. 2) and the axis of the associated eccentric (the eccentric bearing 11a, in FIG. 1 and the eccentric 28, in FIG. 2). In addition, it will be appreciated that by varying this spacing during machining, the ovality of the piston can be altered along the axial length of the piston during machining. Further, the tool (24, FIG. 1, 33, FIG. 2) need not be stationary during machining of the oval piston, the tool could be moved radially in and out to produce a further shaping of the piston.

Figure 3:
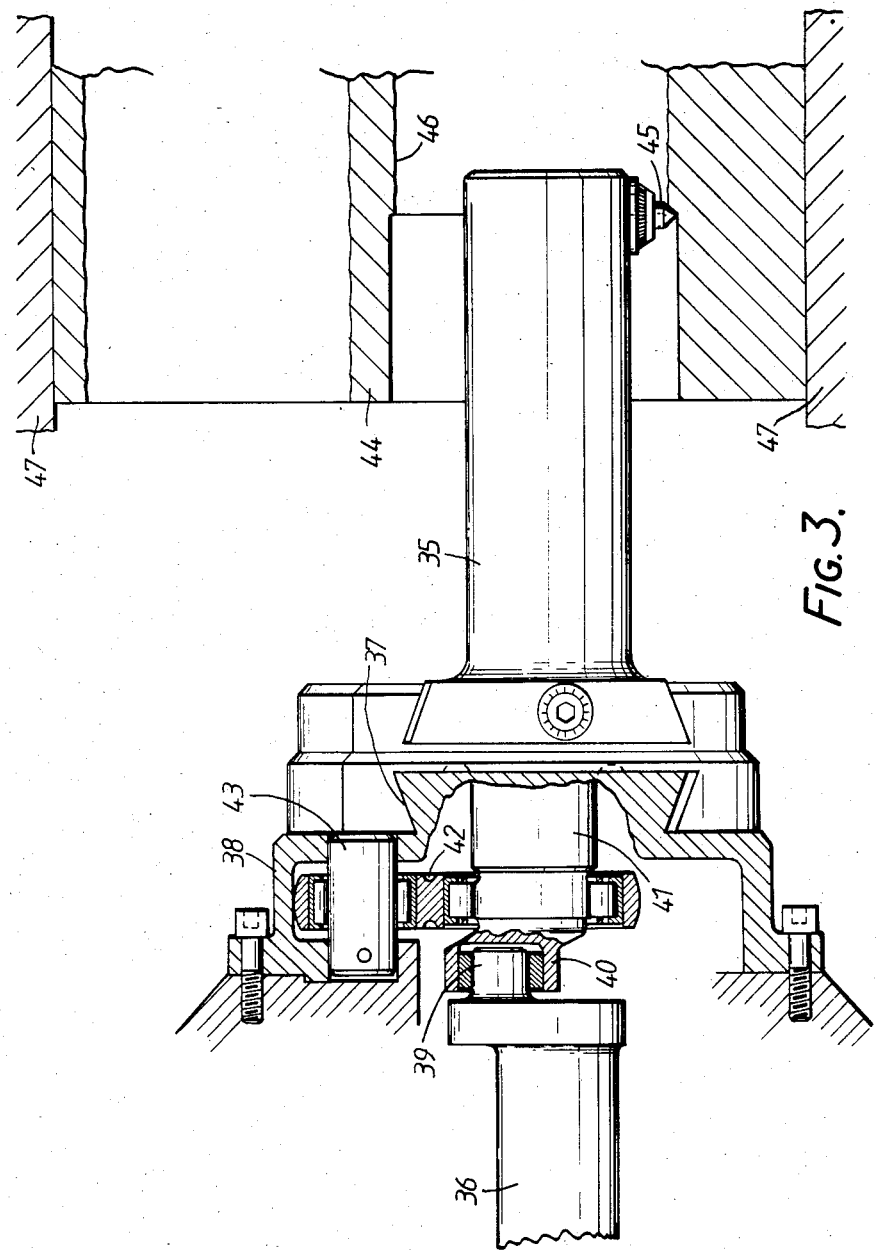
FIG. 3 shows a view of a boring machine which is for boring the interior of a cylinder to a predetermined oval shape and which has a mechanism which is a kinematic inversion of the mechanism of FIG. 2.

Referring next to FIG. 3, the machine tool shown in this Figure is a kinematic inversion of the mechanism shown in FIGS. 1 and 2. A boring bar 35 is driven by a rotatable input shaft 36 and is carried during such rotation on a slide 37 reciprocable on a fixed boring head 38. An eccentric pin 39 is mounted on the input shaft 36 and engages a cranked end 40 of a stub shaft 41 coaxial with the axis of the boring bar 35. A portion of the stub shaft 41 adjacent the cranked end 40 provides support for one end of the line 42 whose other end pivots on a fixed pin 43 mounted on the fixed boring head 38 eccentrically of the input shaft 36.

The arrangement is such that the axes of the pin 39 and the cranked end 40 are parallel with each other and lie in a plane including the minor axis of the oval cross-section which is to be bored when the slide 37 is in a central position. In addition, a radius between the axis of the fixed pin 43 and the axis of the cranked end 40 is parallel to the direction of movement of the slide 37.

In use, a fixed cylinder block 44 is to have the bores 46 thereof bored to an oval interior cross-sectional shape. The cylinder block 44 is mounted in a stationary workpiece holder 47. The input shaft 36 is rotated to rotate the boring bar 35 via the eccentric pin 39 and the stub shaft 41. The offset between the eccentric pin 39, the axis of the input shaft 36 and the axis of the stub shaft 41 causes the boring bar 35 to oscillate on the slides 37 while rotating such that a tool 45 on the boring bar 35 travels in a required oval path.

It will be appreciated that bores of different ovalities can be accommodated by altering the distance between the axis of the eccentrical pin 39 and the axis of the stub shaft 41. The distance may be altered during machining to vary the ovality of a bore along the length of the bore.

It will be understood that the required tool and workpiece movements described above with reference to FIGS. 1 to 3 can be produced other than as described above. For example, the line (22, FIG. 1; 31, FIG. 2; and 42, FIG. 3) could be replaced by a second slide arranged normal to the first slide (16, 17, 21, FIG. 1; 30, FIG. 2; 37, FIG. 3). Alternatively, the required movements could be produced by an epicyclic mechanism. In this case, the mechanism for rotating an oval piston would include a fixed small roller or gear, while the workpiece holder would be provided with an internal hole which is of greater diameter than the small roller or gear and rotates around this roller or gear. For rotating the tool, the tool would be connected to orbit the small roller or within a larger diameter hole, which is stationary.

We claim:

1. A machine tool for turning a piston having a surface of oval cross-section, comprising:
   a rotatable input shaft for imparting rotational drive to the piston and having an axis of rotation,
   slide means connected to the rotatable input shaft for rotation thereby about said input shaft axis of rotation, a piston-carrying member engaging said slide means for rotation thereby, said slide means permitting reciprocation of the piston-carrying member relative to said input shaft in a direction normal to said axis of rotation, a link connected at one end to a fixed pivot defining a link axis of rotation, said link axis of rotation being offset from said input shaft axis of rotation, and connected at an end opposite to said one end to said piston-carrying member, a line between said connections being parallel to the said direction of reciprocation of said piston-carrying member, a tool carried on mounting means for movement in directions towards and away from the axis of rotation of the input shaft, the tool turning said surface when at a fixed point in said direction of movement.

2. A machine tool according to claim 1, wherein said slide means comprises a circular plate carried on the output shaft, a pair of sleeves being carried on said plate on diametrically opposite sides of said axis of rotation of said input shaft, means defining respective bores being provided in said sleeves, guide means extending through each side bore means, fastener means fixing said guide means to respective said sleeves, said guide means being parallel and both said guide means lying in a common plane normal to said axis of rotation of the input shaft, said piston-carrying member including bush means in sliding engagement with said guide means.

3. A boring machine for boring cylinders of oval cross-section in a cylinder block blank, and comprising:

a rotatable boring bar, a cranked end formed on said boring bar, a rotatable input shaft for inparting rotational drive to said boring bar and having an axis of rotation, pivot axis means formed on the rotatable output shaft and defining a pivot axis parallel to and offset from said input shaft axis of rotation, said pivot axis means rotatably engaging said cranked end, slide means carrying said rotatable boring bar and permitting reciprocation of the rotatable boring bar in a fixed direction normal to said input shaft axis of rotation, a fixed pin defining a pivot axis parallel to and offset from said boring bar, a link connected at one end to said boring bar and at an end opposite to said one end to said fixed pin, a line between the axes of said connections being parallel to said fixed direction of reciprocation of the rotatable boring bar, and a tool carried on the boring bar to bore cylinders of oval cross-section in a cylinder block blank.

* * * * *